Figure 1:
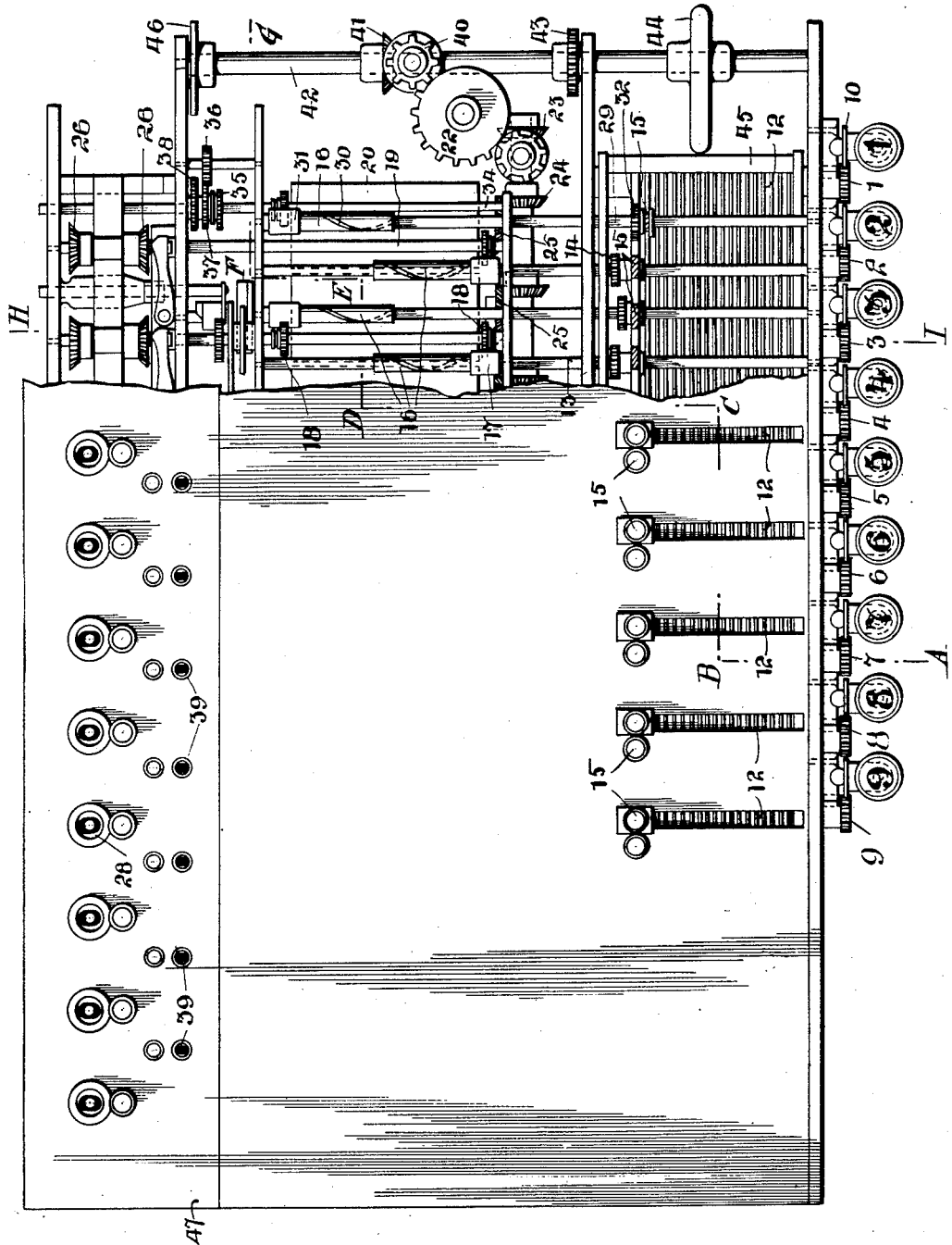

H. CORDT.
CALCULATING MACHINE.
APPLICATION FILED SEPT. 12, 1910.

1,047,391.

Patented Dec. 17, 1912.
3 SHEETS—SHEET 1.

Witnesses:

Inventor:
Hugo Cordt

H. CORDT.
CALCULATING MACHINE.
APPLICATION FILED SEPT. 12, 1910.
1,047,391.
Patented Dec. 17, 1912.
3 SHEETS—SHEET 2.
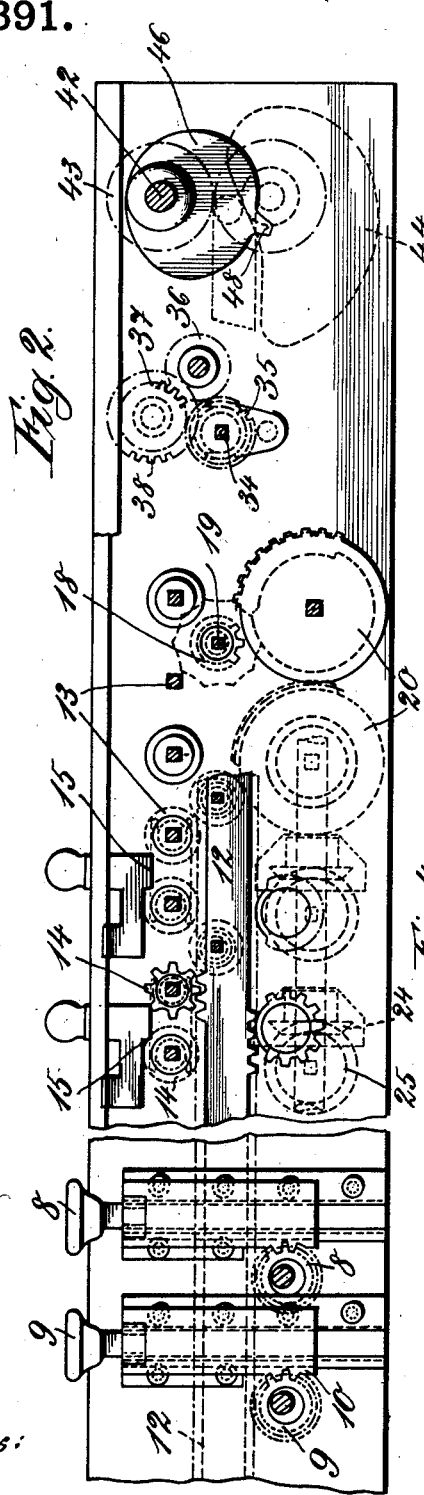
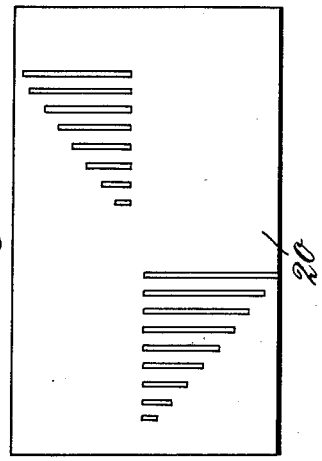
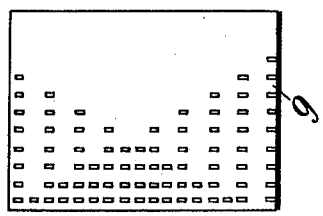
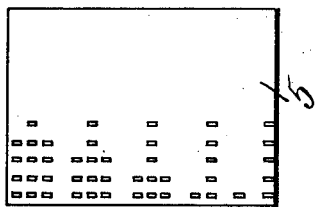
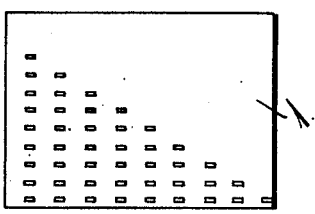

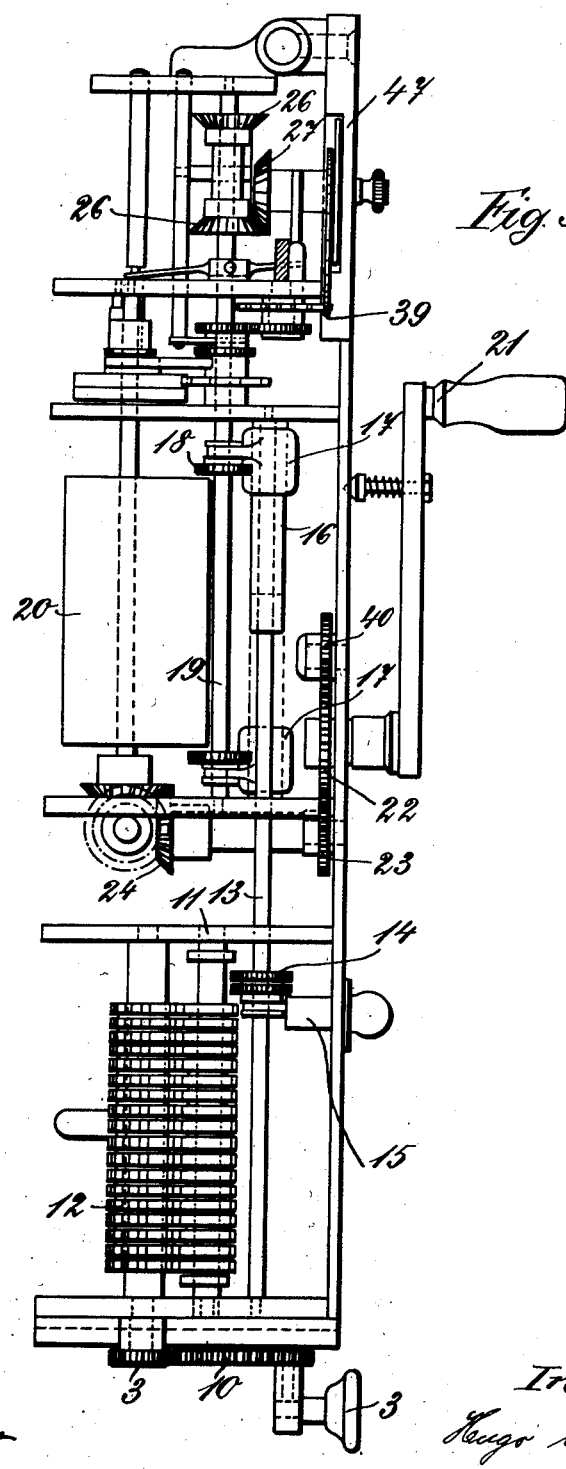

UNITED STATES PATENT OFFICE.

HUGO CORDT, OF NORDENHAM, GERMANY.

CALCULATING-MACHINE.

1,047,391.   Specification of Letters Patent.   Patented Dec. 17, 1912.

Application filed September 12, 1910. Serial No. 581,699.

*To all whom it may concern:*

Be it known that I, HUGO CORDT, a subject of the Grand Duke of Oldenburg, residing at Nordenham, Grand Duchy of Oldenburg, Germany, have invented certain new and useful Improvements in Calculating-Machines, of which the following is a specification.

This invention relates to a calculating machine having nine driving cylinders corresponding to the numbers, one to nine, said cylinders representing each the results of the multiplications of the numbers 1 to 9.

The invention has for its object to improve the construction of the calculating machine in such a manner that although the same is very simple and easy to manipulate, any kind of calculations can be effected. With this improved calculating machine the shifting of the calculating wheels is effected automatically so that it is merely necessary to turn the crank handle 1 for any different calculating operations to be executed. All the mechanisms for the transmitting motion return automatically to the normal position after the calculating operation has been executed.

The improved calculating machine is shown by way of example in the accompanying drawings.

Figure 1 is a plan view of the calculating machine, the lid or top plate being partly removed. Fig. 2 is a section on line A, B, C, D, E, F, G of Fig. 1. Fig. 3 is a section on line H—I of Fig. 1. Figs. 4 and 5 show the cylinder surfaces.

The calculating machine comprises multiplicating cylinders upon which the results of the multiplications of the numbers 1 to 9 are represented by teeth (Fig. 4). The cylinder 1 shows the results of the multiplications with the number 1 as multiplicator, cylinder 2 those of the multiplication with the number 2 as multiplicator and so forth. In Fig. 4 the cylinders 1, 5, and 9 are shown. The cylinders 1 to 9 mesh each with a rack 10 (Figs. 2 and 3) the outer ends of which form keys. Above the cylinders 1 to 9 the mechanism for transmitting the revolving motion of said cylinders is arranged. This mechanism consists of eighteen racks 12 (Figs. 1 and 3) having teeth at both longitudinal edges. Said racks 12 slide upon guide bars 11 (Fig. 3). The cylinders 1 to 9 can be brought to engagement with said racks 12. Shafts 13 of square cross section extend transversely over said racks (Fig. 1) and carry adjustable toothed wheels 14 (Figs. 1 and 2). Said toothed wheels 14 are arranged in pairs and they are mounted upon a sliding piece 15 so that each sliding piece carries at the right hand side a toothed wheel 14 for the transmission of the units, and at the left hand side a toothed wheel for the transmission of the tens. Said sliding pieces have hand knobs projecting through the top plate of the machine and they serve for throwing the multiplicand in gear.

The units and tens being separately arranged on the driving cylinders (Fig. 4) the mechanism for the transmission is also divided into racks for the units and racks for the tens, having their separate reception wheels so that (as has already been mentioned) the toothed wheel at the right hand end of the sliding piece 15 (Fig. 1) meshes with the rack for the units, that at the left hand side meshing with the rack for the tens.

If one of the keys is depressed, as No. 5 for example, its cylinder 5 is turned to the right and thus moves the racks to the right for the corresponding number of teeth. This motion is transmitted to the reception wheels 14 which are put in gear. Suppose the sliding piece for the multiplicator 7 was in gear, its reception wheels therefore would be turned, as the driving cylinder 5 has been actuated, that for the units for five teeth and that for the tens for three teeth, which is equal to 35, the result of the multiplication 5×7.

The shafts 13 carry near one end a worm 16 with a sliding pusher 17 (Fig. 1ᴬ) for transporting the movement of the shaft upon the receiving wheels 18 of the adding mechanism. These receiving wheels 18 are arranged so that the wheel for the tens is mounted upon the same shaft 19 as the next following wheel for the units, the movement of the wheels for the tens being thus combined with the movement of the next following wheels for the units.

A drum 20 (Figs. 1ᴬ, 2, and 3) is arranged below the shafts 19 with the receiving wheels 18, said drum having long teeth arranged in two groups, said teeth of different lengths being arranged in the one group in reverse order to the other group. Thus the transmission from the receiving wheels 18 is effected successively. The hand crank 21

(Fig. 3) drives, by means of the toothed segment 22, the spur wheel 23, the bevel wheel 24 and the bevel pinions 25 and the drum 20, so that the receiving wheels 18 which have been adjusted with regard to said drums 20 are turned and transmit their movement by means of the shafts 19 and bevel pinions 26, to the bevel wheel 27 of the counting device where the result is indicated by the number disks 28 (Figs. 1 and 3.)

The indicating device for the quotient is arranged differently. It consists of a spindle 29 with a worm 30, a sliding pusher 31 and a receiving wheel 32 which is continually in engagement with the extreme unit rack 12. This rack is always pushed toward the right for as many teeth as the depressed key indicates numbers. If therefore the key No. 5 is depressed, said rack 12 and consequently the receiving wheel 32 is moved for five spaces. The toothed wheel 33 is shifted accordingly with regard to the drum 20 and when said drum is being turned, the corresponding numbers are indicated in the counting device by the number disk 39 which is operated from said drum by means of the spindle 34 and toothed wheels 35, 36, 37, 38. From the counting device there can be seen that which is the multiplicator or the quotient.

The invention further concerns the device for automatically returning the driving cylinders and the other parts of the mechanism to the normal positions. With this object in view the toothed segment 22 after having actuated the toothed wheel 23 engages with the toothed wheel 40 (Fig. 1) and turns, through the intermediary of the cog wheels 41, the spindle 42, the toothed wheels 43 and an eccentric disk 44 (Figs. 1 and 2) which pushes back by means of the pusher 45 all the racks and consequently their cylinders. During this period the eccentric disk 46 (Figs. 1 and 2) lifts the counting device 47 and the cam 48 (Fig. 2) shifts the same for the length of one space to the right, whereupon the device drops back along the eccentric disk 46.

The calculating machine operates as follows: For multiplication, if for example 51 has to be multiplied by 27, the multiplicand 51 is put in gear by means of the corresponding sliding pieces 15 and the key 7 is depressed. The cylinder 7 being thus revolved shifts to the right the corresponding racks 12 for the lengths of 7, 14, 21, 28, 35, 42, 49, 56, and 63 spaces. Those of the receiving wheels 14 which are put in gear are revolved, that is to say, in the present case the pair of toothed wheels 14 which are adjusted on 1 take up the movement of the racks, that for the tens with zero and that for the units with seven values and the toothed wheel pair adjusts on number 5 the movements for three and five teeth respectively. This movement of the receiving wheels 14 is transmitted by the worm 16 and guide-pieces 17 to the receiving wheels 18 of the summing up device. Thus the multiplicator number is adjusted. On turning the crank handle 21 the drum 20 is made to revolve and the following product appears:

7+1 equal to 7 plus
7×5 equal to 35

These numbers are added up so that the units and the tens appear on one number disk, and the sum 357 appears as the first product. At the second turn of the crank handle 21 the adding up device with the number 357 is shifted for the length of one space to the right, and at the same time the driving cylinder 7 with its key is returned to the normal position. Hereupon the key 2 is depressed whereby the receiving wheels are shifted upon their spindles, and if the crank handle 21 is being turned, the drum 20 adds the result of 2×51 to the number 357, that is to say:
02 and
10 and the final result is

1377 that is to say the product of the multiplication.

The following is an example of addition:— To sum up 345+491 and 749, the first number 345 is marked at the graduations for the multiplicand and the key 1 is depressed so that the receiving wheels 18 are shifted on their spindles according to the product of 1×345. The crank handle is turned again and the number is registered in the adding device. Hereupon the second number 491 is marked and multiplied by 1 and the result added up in the adding device with the first number. For the third number 749 the same procedure is followed. It is evident that the shifting device has to be put out of gear for the adding operation.

For a sum of division one proceeds as follows: The cogwheels 26 are shifted on their spindles 19 so that the number disks 28 turn in the opposite direction as before. Instead of adding the products obtained they are subtracted. To divide 357 by 51, the dividend 357 is marked by hand on the counting device and the divisor 51 is marked on the multiplicand graduations so that the divisor can be deducted from the dividend, that is to say, the tens of the divisor are placed under the tens of the dividend. After having mentally calculated that the divisor can at the utmost be contained seven times in the dividend, the key 7 is depressed. If now the crank handle 21 is turned, the products of the driving cylinder 7 which appear at the same height as the divisor are deducted from the dividend. The quotient device therefore indicates 7.

The subtractions are made in the same manner as the additions, only the cogwheels 26 have first to be shifted on their spindles 19 so that the number disks 28 revolve in the opposite direction as before

I claim:

An improved calculating machine comprising in combination nine driving cylinders one for each number, having each the products of the multiplication of the number which it represents with all the other numbers marked upon its surface in the form of teeth arranged in superposed ranges, the units being arranged in separate ranges and the tens as well, the receiving wheels to which the motion of said driving cylinders is transmitted, racks to be shifted by said driving cylinders and worm spindles connected with said racks and with said receiving wheels, shifting pushers on said worm spindles for shifting said receiving wheels according to the movement of the racks, a drum having two series of teeth arranged in reverse order in the two series, a crank handle for operating said drum, an adding-up device of convenient construction and a transmission between said drum and said adding-up device, the keys for operating the mechanism, and means for returning the driving cylinders and the keys to the normal position upon a second revolution of said drum, said means consisting of an eccentric disk connected with the crank handle by a suitable transmission and designed to push back the said racks, and a device for lifting the adding up device and shifting the same to the right for the length of one tooth and returning the same to the original position, substantially as described and shown and for the purpose set forth.

In witness whereof I have hereunto set my hand in the presence of two witnesses.

HUGO CORDT.

Witnesses:
R. HORSTMANN,
L. MEYER.